(12) United States Patent
Edelman

(10) Patent No.: US 6,292,809 B1
(45) Date of Patent: *Sep. 18, 2001

(54) SELECTING CELLS IN A TABLE HAVING INDIVIDUAL CELLS AND JOINED CELLS

(75) Inventor: Bradley A. Edelman, San Francisco, CA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,327

(22) Filed: Aug. 7, 1997

(51) Int. Cl.[7] ....................................... G06F 17/30
(52) U.S. Cl. .................. 707/503; 707/504; 707/509; 707/903; 707/905; 707/100; 707/102; 706/45; 706/62
(58) Field of Search .................... 707/1–2, 503, 707/504, 509, 510, 517, 518, 519, 520, 100–104; 345/339–340, 345, 440; 703/503–504, 509, 903–905; 706/45–47, 62

(56) References Cited

U.S. PATENT DOCUMENTS

| | | | |
|---|---|---|---|
| 5,623,591 | * | 4/1997 | Cseri ..................................... 345/326 |
| 5,632,009 | * | 5/1997 | Rao et al. ............................. 707/509 |
| 5,710,899 | * | 1/1998 | Eick ..................................... 345/339 |
| 5,717,939 | * | 2/1998 | Bricklin et al. ....................... 395/764 |
| 5,784,545 | * | 7/1998 | Anderson et al. .................... 707/507 |
| 5,845,271 | * | 12/1998 | Thaler .................................... 706/16 |
| 5,848,187 | * | 12/1998 | Bricklin et al. ....................... 382/187 |
| 5,880,742 | * | 3/1999 | Rao et al. ............................. 345/440 |
| 5,883,635 | * | 3/1999 | Rao et al. ............................. 345/440 |
| 5,911,145 | * | 6/1999 | Arora et al. .......................... 707/514 |

FOREIGN PATENT DOCUMENTS

WO-97/07454 * 2/1997 (WO) ......................................... 9/46

OTHER PUBLICATIONS

Laura Lemay, Teach yourself web publishing with HTML 3.2 in 14 days, professional reference edition, chapter 13, pp. 345–385, Jun. 1996.*

* cited by examiner

*Primary Examiner*—Jack Choules
*Assistant Examiner*—Srirama Channavajjala
(74) *Attorney, Agent, or Firm*—Fish & Richardson P.C.

(57) ABSTRACT

A method and apparatus for selecting cells in a table. The table includes individual cells and joined cells. The joined cells including two or more individual cells forming a rectangular region within the table. The cells have one or more user manipulatable properties and each cell may contain data. The method includes selecting a starting cell, identifying a current cell including defining a previous cell along a path between the starting cell and the current cell, and determining a selection of cells based on the starting, current and previous cells.

23 Claims, 10 Drawing Sheets

SELECTING CELLS IN A TABLE HAVING INDIVIDUAL CELLS AND JOINED CELLS

BACKGROUND OF THE INVENTION

The present invention relates generally to computing systems and more particularly to a system and a method for selecting cells in a table.

The Internet is a world-wide network of interlinked networks connected by specific protocols (e.g., the Internet Protocol (IP)). The Internet provides for file transfer, remote login, electronic mail, news and other services. The World Wide Web (the "Web") is a hypertext based system for finding and accessing Internet resources. Hypertext refers to specific content elements within a document that contain links to other documents. A user desiring to retrieve information from the Web invokes a browser, a client program that runs on a client computer (Windows, Mac or UNIX environment), allowing a user to display documents retrieved from the Web.

Information is organized on the Web in web sites. A web site is a collection of linked files resident on a server that may be accessed by a browser application. Typically, the web site contains a initial page (the "home page"), which is displayed when the browser first accesses the site. The web site may include one or more other pages which may be accessed by selecting links resident on the home page or other pages within the web site.

The process of constructing a web site includes identifying content for display, structuring the content, building the web site, and transferring the final product to a web server. The process of building the web site includes creating the hypertext mark-up language (HTML) associated with the links for a particular page of content.

Conventional web site construction mechanisms include tools for manipulating pages of content. Some tools allow a user to manipulate content within a page. Other tools allow a user to position a page in the web site. For example, a drag and drop tool may be used to select items located on a page and reposition the items to a second location within the page.

An example of a type of content element which may be located within a web site page is a table. A table includes a number of cells. The cells may be arranged in rows and columns. Individual cells may be joined with other cells to form joined cells. A joined cell defines a region of contiguous cells that share properties and may be manipulated as an single entity. Joined cells form rectangular regions in a two-dimensional table structure.

Cells may contain content, such as text, which is displayed within the cell as part of the table. Associated with each cell is a set of properties. Examples of properties include horizontal and vertical text alignment (justification) and cell height, width and background color.

It is often desirable to select a number of cells within a table in order to apply a common property to all the members of the grouping. Conventional selection tools make use of a pointing device for selecting a group of cells within a table. Conventional cell selection tools include a selection mechanism for identifying a starting cell (frame of reference), a positioning mechanism for indicating a second location within the table defining a boundary box containing one or more cells, and a release mechanism for selecting the cells which intersect the boundary box. Selection tools may also include options for defining the boundary box and how to select the cells contained within the boundary box. The decisions as to whether or not a cell is contained within a particular grouping becomes complicated when cells within the table are joined.

SUMMARY OF THE INVENTION

In one aspect, the invention provides a method for a method of selecting cells in a table. The table includes individual cells and joined cells. The joined cells including two or more individual cells forming a rectangular region within the table. The cells have one or more user manipulatable properties and each cell contains data. The method includes selecting a starting cell, identifying a current cell including defining a previous cell along a path between the starting cell and the current cell, and determining a selection of cells based on the starting, current and previous cells.

Aspects of the invention include numerous features. The step of determining a selection includes determining horizontal and vertical change resulting from movement along a path from the previous cell to the current cell.

If a change results in growth in one axis only, then a decaying operation is invoked toward the starting cell in the direction of change until a selection is located. The step of determining a selection includes determining a last selection from the previous cell and the starting cell and trimming a requested selection prior to decaying.

If a change results in decay in one axis only, then a decaying operation is invoked toward the starting cell in the direction of change until a selection is located. If none is located, a selection is determined by locating a selection having a largest size in a dimension having the change. If the decaying step does not yield a selection then the requested selection may be reset prior to determining a selection by locating a selection having a largest size in a dimension having the change.

If a change indicates growth in one axis and decay in another, a selection is determined by locating a selection having a largest size in a dimension having a largest change.

If a change indicates horizontal and vertical growth then a selection is determined by locating a selection having a largest size in a dimension having a largest change.

If a change indicates horizontal and vertical decay, a selection is determined by locating a selection having a largest size in a dimension having a smallest change.

Advantages of the invention may include one or more of the following. Cell selection may be made intuitively, based on the a user defined starting location, ending location as well the path traversed between the two.

Other advantages and features of the invention will be apparent from the following description and claims

DESCRIPTION OF THE PREFERRED EMBODIMENTS

Figure 1:
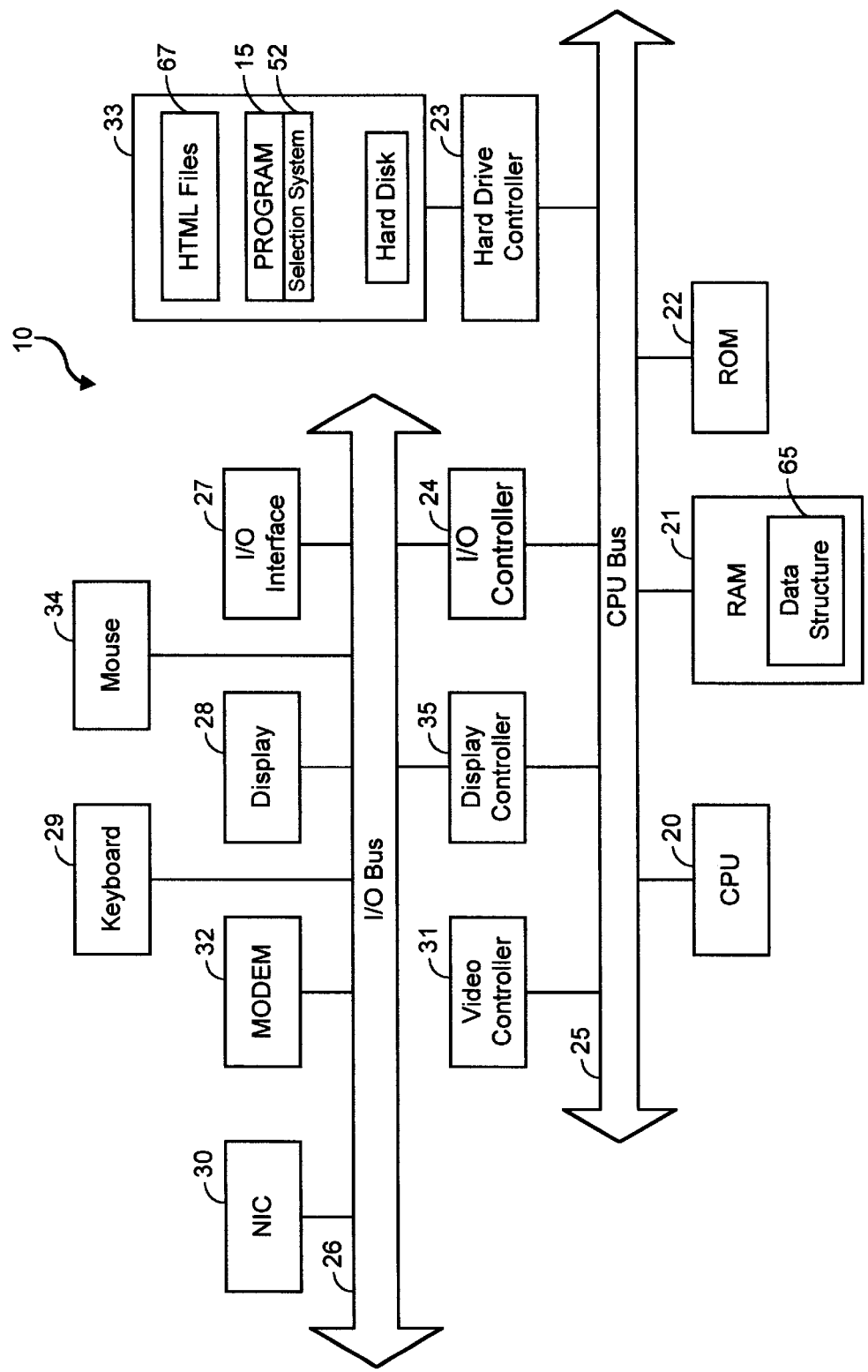
FIG. 1 is a block diagram of a computer system that may be used to execute a web page authoring program.

Referring to FIG. 1, the invention may be implemented in the form of a graphics-based page authoring program 15 containing executable instructions to be carried out in a programmable processing system 10. The system 10 includes, among other things, a processor 20, a random access memory (RAM) 21, a non-volatile memory 22 (for example, a writable read-only memory (ROM) such as a flash ROM), a hard drive controller 23, a video controller 31, a display controller 35 and an input/output (I/O) controller coupled by a processor bus 25. The system 10 may be preprogrammed, e.g., in ROM, or it may be programmed (and reprogrammed) by loading the page authoring program 15 from another source such as a floppy disk, a CD-ROM or another computer.

The hard drive controller 23 is coupled to a hard disk 33 suitable for storing executable computer programs, including the page authoring program 15 and data. The video controller 31 may be coupled to a video recorder (not shown), which may be used for storing and importing video footage and for writing final output. The I/O controller 24 is coupled by means of an I/O bus 26 to an I/O interface 27. The I/O interface 27 receives and transmits data (e.g., stills, pictures, movies and animations for importing into a composition) in analog or digital form over communication links such as a serial link, local area network, wireless link or parallel link. Also coupled to the I/O bus 26 are display 28, keyboard 29, a network interface card (NIC) 30, a pointing device such as a mouse 34 and a modem 32 for connecting system 10 to another computer or to a computer network, e.g., an Internet service provider (ISP) or an online service provider (OSP). Alternatively, separate connections (separate buses) may be used for some of the components connected to the I/O bus 26, including the I/O interface 27, the display 28 and the keyboard 29.

Figure 2:
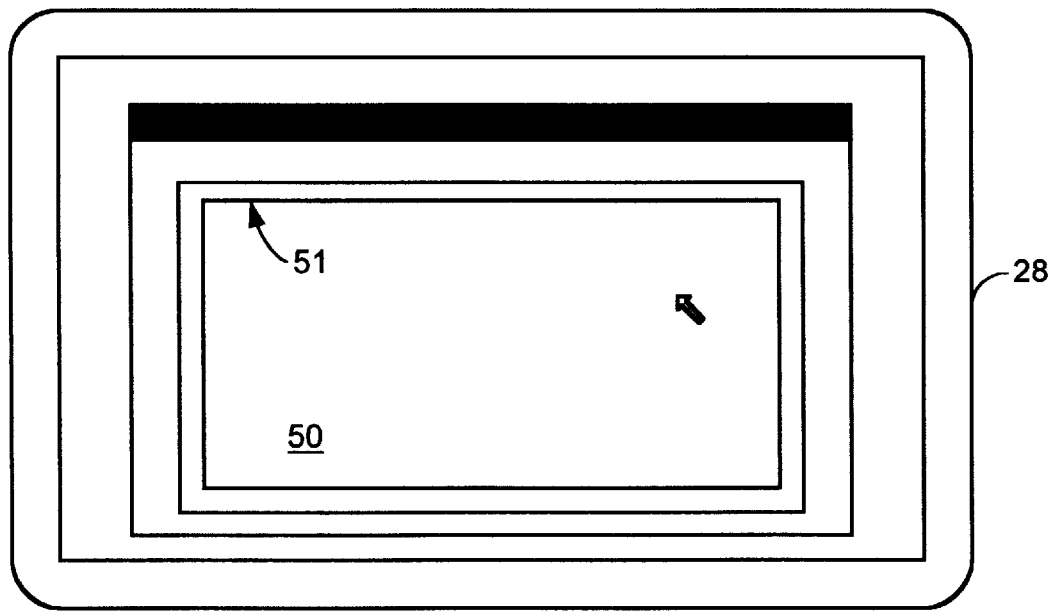
FIGS. 2 and 3 are front views of a computer display showing the creation of a web page with the page authoring program.

Referring to FIG. 2, the graphics-based page authoring program causes the processing system to generate a visual image of a web page 50 on display 28 (FIG. 1). The visual image represents a facsimile of the actual appearance of the web page 50 as viewed through a web browser, such as Microsoft Internet Explorer or Netscape Navigator. Upon execution of the page authoring program, the visual image represents a blank web page 50 surrounded by a border 51. The user may enter text and graphics within the border 51 and may create links in the page to other web resources.

Figure 3:
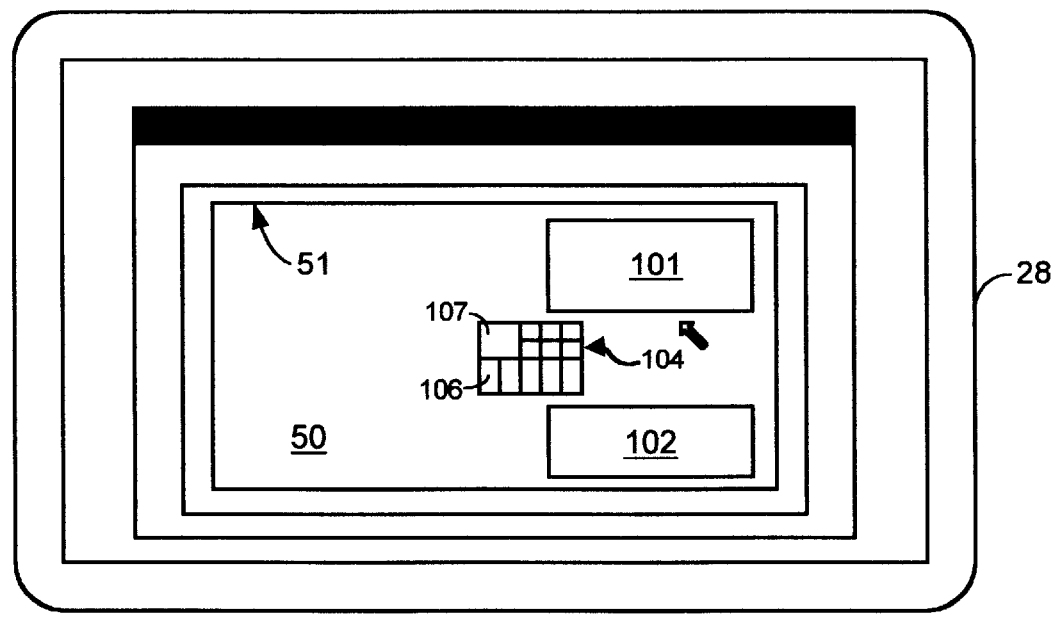

Refer now to FIG. 3, web page 50 may include one more content elements including an image area 101, a text area 102 and a table 104. Table 104 may include a number of cells 106. Data within the cells 106 may be in the form of text, graphics or other information. Often it is desirable for a user to select and join cells or select a grouping of cells so that common properties of each of the selected cells can be easily changed. Table 104 may include joined cells 107 which form rectangular regions within table 104.

Figure 4:
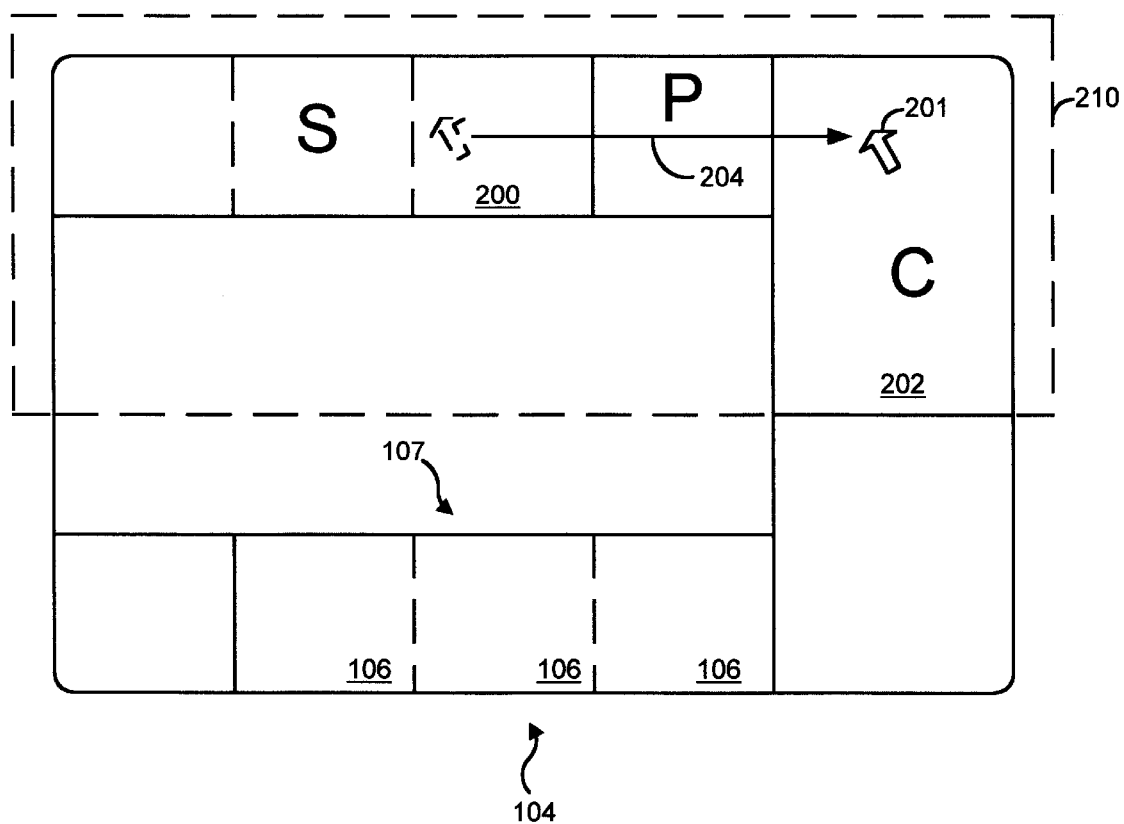
FIG. 4 is a block diagram of a table created by the page authoring program.

Referring now to FIGS. 1 and 4, the graphics-based page authoring program 15 includes a cell selection system 52 for selecting cells within table 104. Cell selection system 52 may be software including instructions for selecting groupings of cells based on user input. The process of selecting a group of cells within table 104 includes identifying a starting cell 200. The starting cell may be a individual cell 106 or joined cell 107. Starting cell 200 may be identified by use of a keyboard or a pointing device such as a mouse or joystick. For example, starting cell 200 may be selected by depressing a button on a mouse when the mouse icon 201 (arrow) is located in the starting cell. After the starting cell has been identified, the user may manipulate the pointing device to identify a current cell 202. Starting cell 200 and current cell 202 define a boundary box 210 which is examined by the cell selection system to determine a "best" cell selection. The user may indicate the current cell 202, for example, by dragging the mouse from the starting cell location, while holding down the left-most mouse button, across a mouse pad causing icon 201 to move into the current cell. When the current cell has been identified, the cell selection tool is used to determine which cells the user intended to group together.

The information required to determine the best cell selection includes the starting cell (S), the current cell (C), the identification of a previous cell (P) in the path 204 traversed by the user in arriving at the current cell and the last valid selection (LVS). Path 204 may traverse through one or more other cells in the table. However, the only portion of the path relevant to the determination of a best selection is the portion between the previous cell and the current cell.

The selection system may highlight only the starting cell (or joined cell of which that cell is a member) until a larger grouping of cells is determined to be valid. As the user drags the mouse icon from starting cell 200 to current cell 202, for example, the selection system determines whether the selection of the individual cells defined by the boundary box enclosing cells 200 and 202 is valid. If so, then the cell selection tool highlights this region indicating a valid selection. Similarly, as the user continues to drag the mouse icon into other cells, the selection system determines whether the starting cell and new current cell constitute a valid selection. If not, then the last valid selection may remain highlighted.

The selection system processes user input based upon an underlying grid structure for table 104. Typically, once joined, the underlying cells within a joined cell are not visible to the user. However, individual cells 106 within a joined cell 107 are examined during the selection process as will be described in greater detail below.

The starting and current cell define a boundary box which may be examined by the selection system to determine if the boundary box encloses a valid selection. A requested selection is valid based upon the evaluation of the grouping of cells enclosed within the boundary box in accordance with two rules. A valid selection must be rectangular (the first or rectangular rule). In addition, if selection includes a cell that is part of a joined cell, then the selection must enclose all the cells in the joined cell (the second or enclosure rule). That is, a subset of all the cells in a joined cell may never be included in a valid selection. A requested selection (grouping of cells) that satisfies these rules will result in a valid selection that may be highlighted for display to the user. By definition, a valid requested selection is the best selection.

However, if a requested selection is not valid, then the selection system must determine the best selection from the potentially numerous valid groupings of cells contained within the original boundary box. As described below, the selection system makes advantageous use of the direction by which the user traverses along the path between the previous cell and the current cell to infer which cell grouping is best to select.

Figure 5:
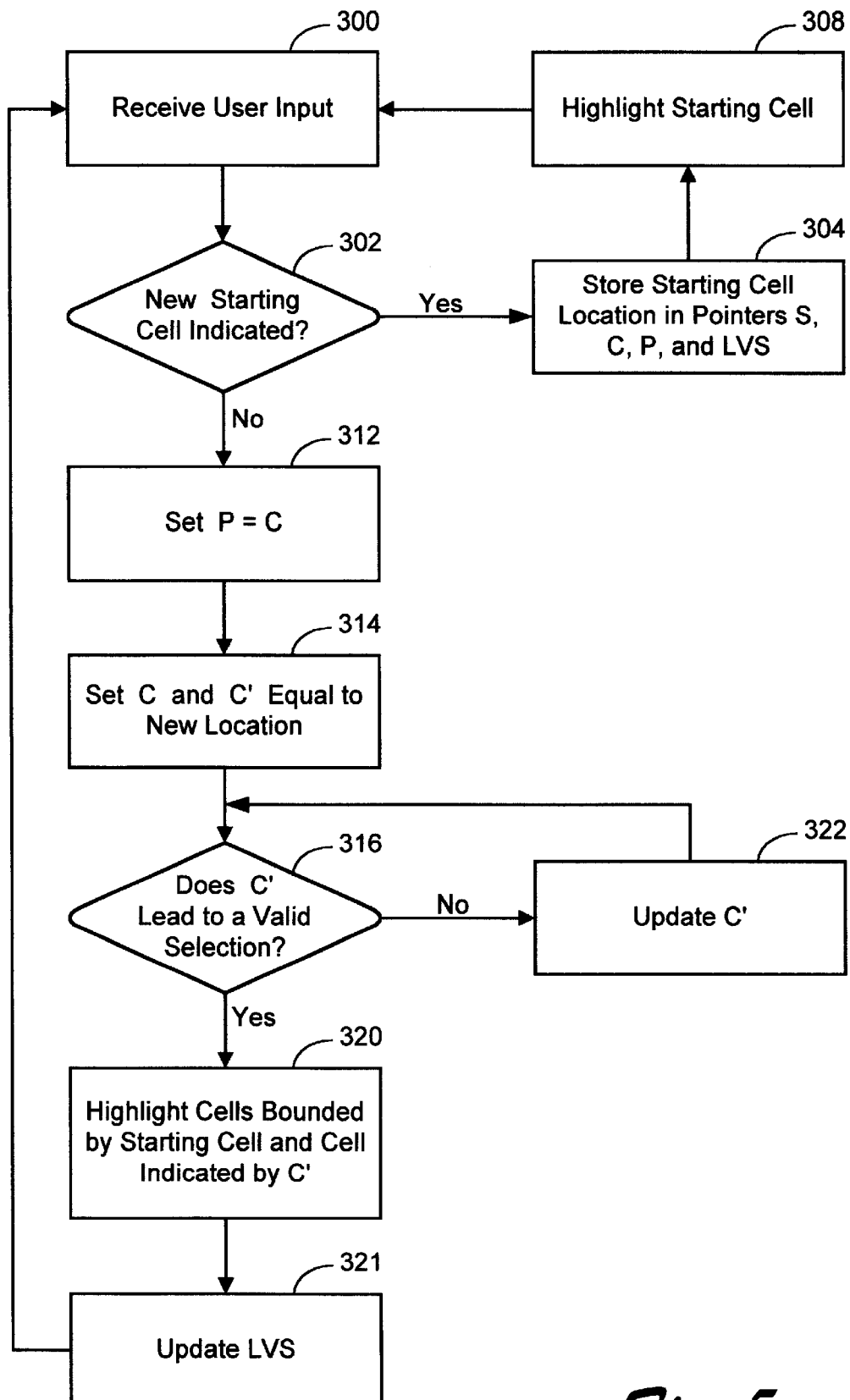
FIG. 5 is a flow diagram of a process of selecting cells in a table.

Referring to FIG. 5, the selection system responds to user actions as follows. The selection system receives user input, such as movement of the mouse icon across web page 100 (step 300) and records the movement in pointers which indicate the location in the table for the starting (pointer S), previous (pointer P), current (pointer C) cells and last valid selection (LVS pointer). The LVS pointer includes information for defining the last valid selection and may include both starting cell location data as well as an "end" cell location both of which define the boundary box associated with the last valid selection.

If the mouse icon is positioned in a new starting cell (which may be indicated by the user depressing the left-most mouse button) (step 302), the selection system records the location of the starting cell in pointers S, P and C and in the LVS pointer (for both the starting and end cell locations) (step 304). If the mouse icon is located in the starting cell, the selection system highlights the starting cell (step 308) and waits for further user input (step 300).

If the mouse icon is not in the starting cell (step 306) the selection system sets P=C (step 312) and then C to the location of the cell which is currently indicated by the mouse (step 314). In addition, the selection system stores the currently indicated location in a temporary buffer C'. The selection system then determines whether the location identified and stored in C' would lead to a valid selection (step 316). As described above, a selection is valid if the boundary box defined by the starting and current location (location stored in C') satisfies the rectangular and enclosure rules. If the location stored in C' does not result in a valid selection (step 316), the selection system updates C' (step 322), as described below, and determines whether the updated location identified for C' leads to a valid selection (step 316). If the location indicated by C' is a valid selection (step 316), the selection system may highlight the cells enclosed by the boundary box defined by the starting cell and the cell indicated by C' (step 320) update the LVS pointer with the C' information (update the end cell location) (step 321), and await further user input (step 300).

Figure 6A:
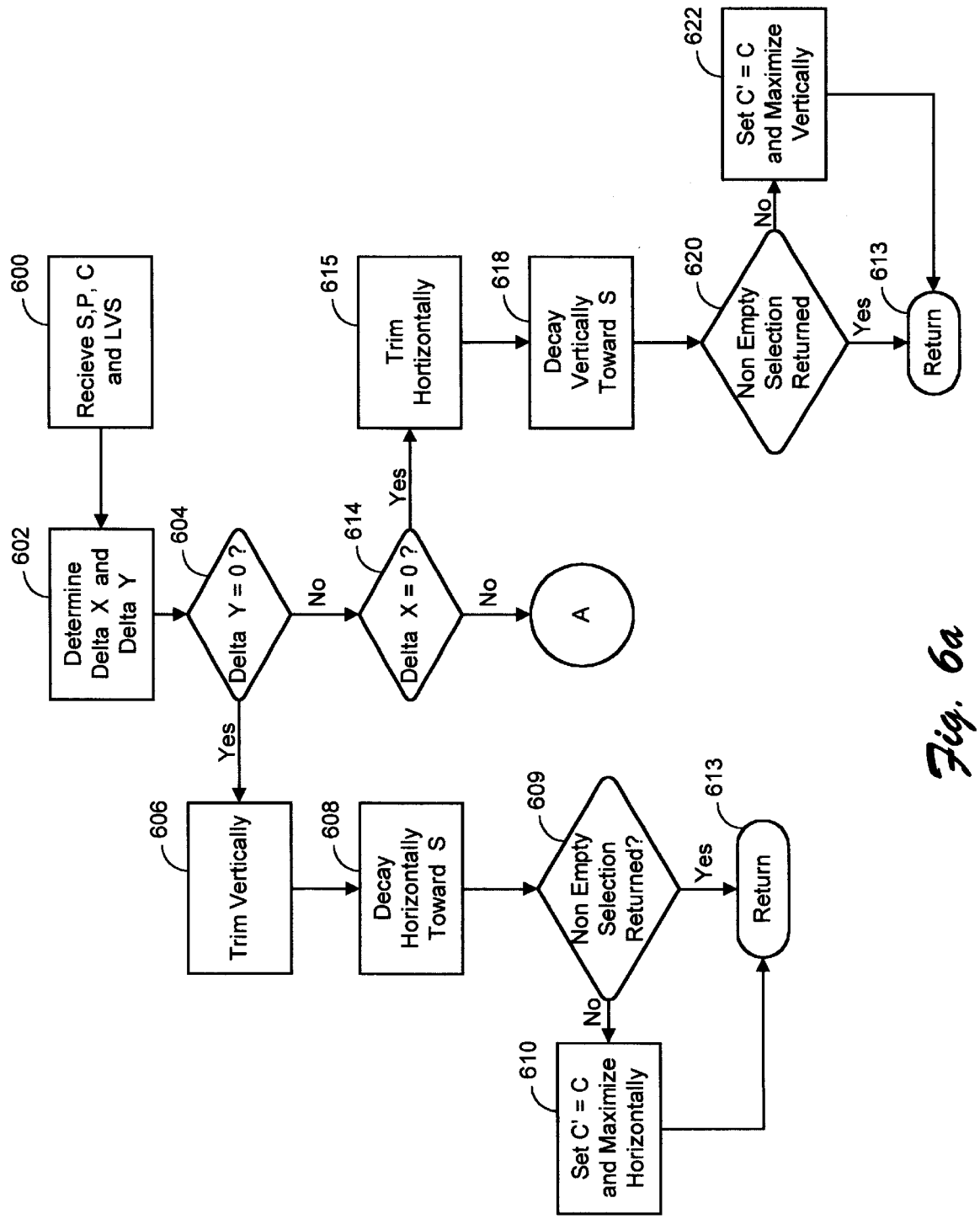
FIGS. 6A and 6B are a flow diagrams of a process for updating a cell pointer for determining a best cell selection according to the present invention.
Figure 6B:
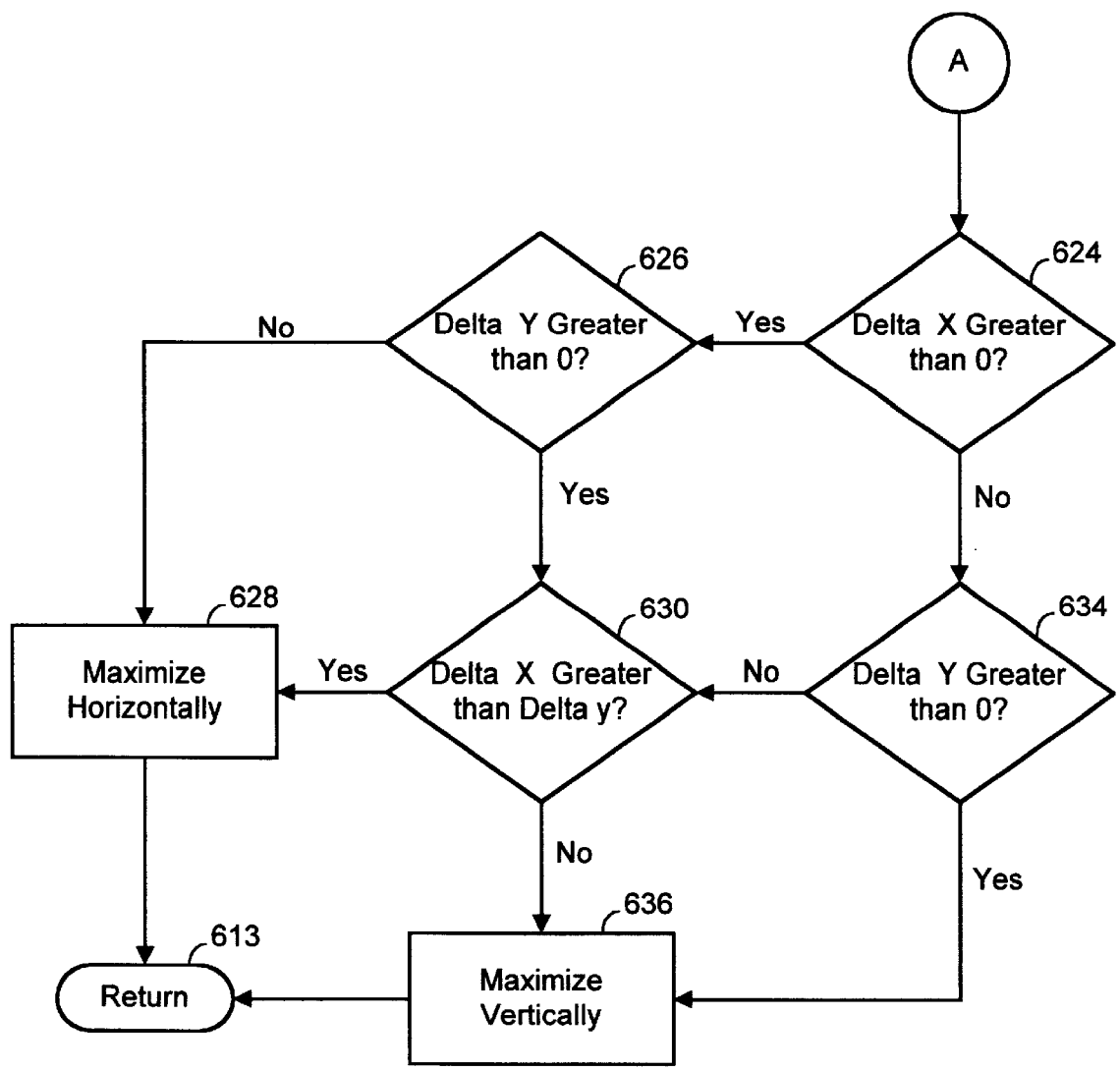

Referring to FIGS. 6A and 6B, the process (step 322 of FIG. 5) for updating the location identified by C' includes receiving S, P, C and LVS pointer information (step 600). The selection system determines the change in horizontal position ($\Delta x$) of the current cell C' and the change in the vertical position ($\Delta y$) of the current cell C' relative to the previous cell position P (step 602). Thus, $$\Delta x = C_x - P_x$$

$$\Delta y = C_y - P_y$$

where $C_x$ and $P_x$ correspond to the horizontal positions of the current cell and the previous cell, respectively, and $C_y$ and $P_y$ correspond to the vertical positions of the current cell and the previous cell, respectively. Note the signs (polarity) of $\Delta x$ and $\Delta y$ may be adjusted with respect to axial symmetry (e.g., growth in the negative direction on either axis is still considered positive growth).

If $\Delta y=0$ (step 604), the selection system performs a vertical trim of the requested selection (step 606). The vertical trim function updates the C' pointer to reflect the same vertical (or horizontal position if a horizontal trim is invoked) position as the end cell stored in the LVS pointer. The trim function is used to guarantee a valid selection will be returned from the decay function after a movement characterized by growth in one axis only. At a minimum, the LVS will be returned as a valid selection. For example, if the LVS pointer indicates a location for the end cell as having coordinates in the table of (x,y) and the C' pointer indicates that the current cell has coordinates of (x',y'), the vertical trim operation will result in an update to the coordinates of the C' pointer to reflect a location (x',y). If $\Delta y=0$ (step 604) and $\Delta x>0$ the selection system decays horizontally toward S (step 608), as described with respect to FIG. 7A, and returns with the updated location for C' (step 613). Note that no specific check for growth in the horizontal axis (x) is performed. If horizontal growth occurs, a decay process is guaranteed to return a valid non-empty selection. If decay arises in the horizontal axis, then the maximize operation described below may be required to be performed.

If $\Delta y=0$ (step 604) and $\Delta x<0$, the selection system decays horizontally toward S (step 608). If a valid non-empty selection is determined (step 609), then an updated location for C' is returned (step 613). If a valid non-empty selection is not returned, the selection system resets C' to the value stored in C and maximizes horizontally (step 610), as described with respect to FIG. 8A, and returns with the updated location for C' (step 613).

If $\Delta x=0$ (step 614), the selection system performs a horizontal trim of the requested selection (step 615). The horizontal trim function updates the C' pointer to reflect the same horizontal height as the end cell stored in the LVS pointer. If $\Delta x=0$ and $\Delta y>0$, the selection system decays vertically toward S (step 618), as described with respect to FIG. 7B, and returns with an updated location for C' (step 613). Note that no specific check for growth in the vertical axis (y) is performed. If vertical growth occurs, a decay process is guaranteed to return a valid non-empty selection. If decay arises in the vertical axis, then the maximize operation described below may be required to be performed.

Figure 7A:
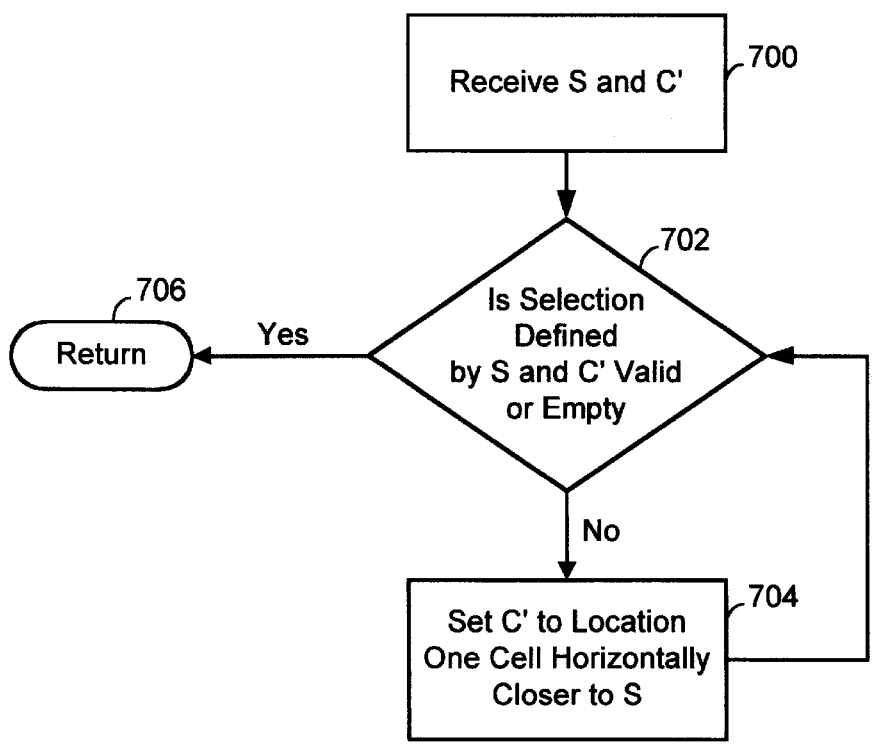
FIGS. 7A and 7B are flow diagrams for a decay process.
Figure 7B:
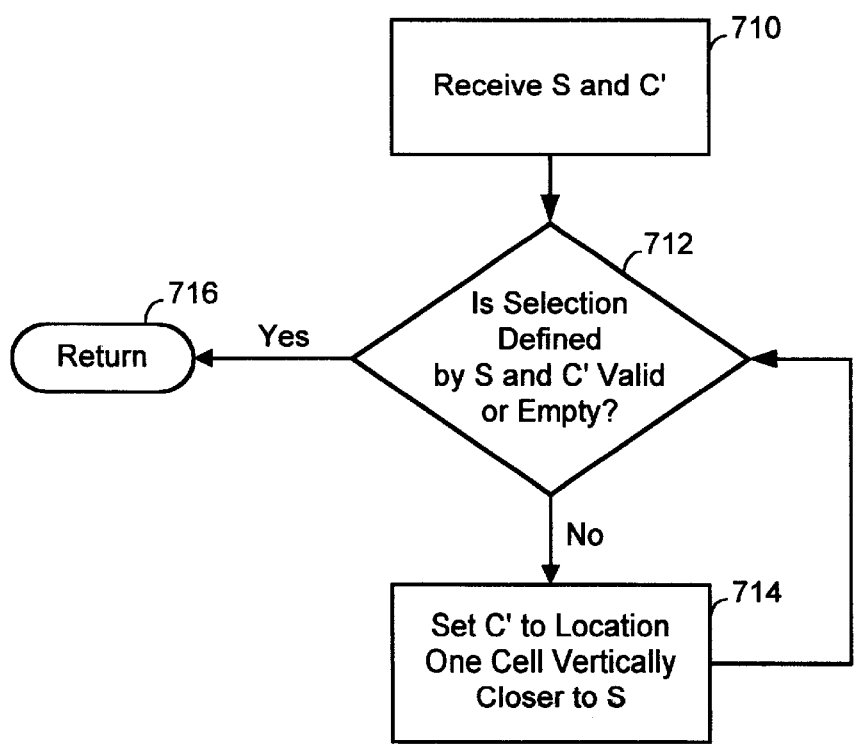

If $\Delta x=0$ and $\Delta y<0$, the selection system decays vertically toward S (step 618), as described with respect to FIG. 7B. If a valid non-empty selection is determined (step 620), then an updated location for C' is returned (step 613). If a valid non-empty selection is not returned, the selection system resets C' to the value stored in C and maximizes vertically (step 622), as described with respect to FIG. 8B, and returns with an updated location for C' (step 613).

If $\Delta x>0$ (step 624) and $\Delta y<0$ (step 626) the selection system maximizes horizontally (step 628) and returns with an updated location for C' (step 613).

If $\Delta x>0$ (step 624), $\Delta y>0$ and $\Delta x>\Delta y$ (step 630) the selection system maximizes horizontally (step 628) and returns with an updated location for C' (step 613). However, if $\Delta y>\Delta x$ (step 630) the selection system maximizes vertically (step 636) and returns with an updated location for C' (step 613).

If $\Delta x<0$ (step 624) and $\Delta y>0$ (step 634) the selection system maximizes vertically (step 636) and returns with an updated location for C' (step 613).

If $\Delta x<0$ (step 624), $\Delta y<0$ and $\Delta x>\Delta y$ (step 630) the selection system maximizes horizontally (step 628) and returns with an updated location for C' (step 613). However, if $\Delta y>\Delta x$ (step 630) the selection system maximizes vertically (step 636) and returns with an updated location for C' (step 613).

Note if the change in horizontal position ($\Delta x$) is greater than the change in vertical position ($\Delta y$), the selection system maximizes horizontally (step 628) and returns with an updated location for C' (step 613); otherwise, the selection system maximizes vertically (step 636) and returns with an updated location for C' (step 613).

The decay process and the maximize process are applied by the selection system to determine which cells will be selected and highlighted. As explained below, the decay and maximize functions have horizontal and vertical variations which are similar to each other in operation, except for the orientations in which they are applied.

Decay Processes

The decay process takes the current selected cells and produces either a valid selection or empty selection based on the rules set out in the selection process. For example, a decay horizontally function, will examine the current cell (in relation to the starting cell) in a requested selection and in the event that the current cell results in a selection that is not valid, will begin to examine other selections by the process of decaying one cell at a time in a horizontal direction. At each cell location, the validity of the "new" requested selection is determined. The decay process continues until the selection becomes valid or empty.

Referring to FIG. 7A, the selection system performs the horizontal decay process as follows. S and C' are received (step 700). The selection system determines if S and C' define a valid or empty selection (the boundary box enclosing S and C' satisfies the rectangular and enclosure rules) (step 702). If the selection is valid or empty, the selection system returns with the location of C' unchanged (step 706); otherwise, the selection system sets C' to a location one subcell horizontally closer to S (step 708). The decay process then continues at step 702 until a valid or empty selection is determined. A pseudocode representation for the function for decaying an object horizontally is shown in Appendix A.

Note that decay is always in the direction towards the starting cell location or point of origin. A similar function known as vertical decay is also used by the present invention. The vertical decay function performs the exact same operation as the horizontal decay function only in the vertical axis.

Referring to FIG. 7B, the selection system performs the vertical decay process as follows. S and C' are received (step 710). The selection system determines if S and C' define a valid or empty selection (the boundary box enclosing S and C' satisfies the rectangular and enclosure rules)(step 712). If the selection is valid or empty, the selection system returns with the location of C' unchanged (step 716); otherwise, the selection system sets C' to a location one subcell vertically closer to S (step 718). The decay process then continues at step 702 until a valid or empty selection is determined.

Figure 7C:
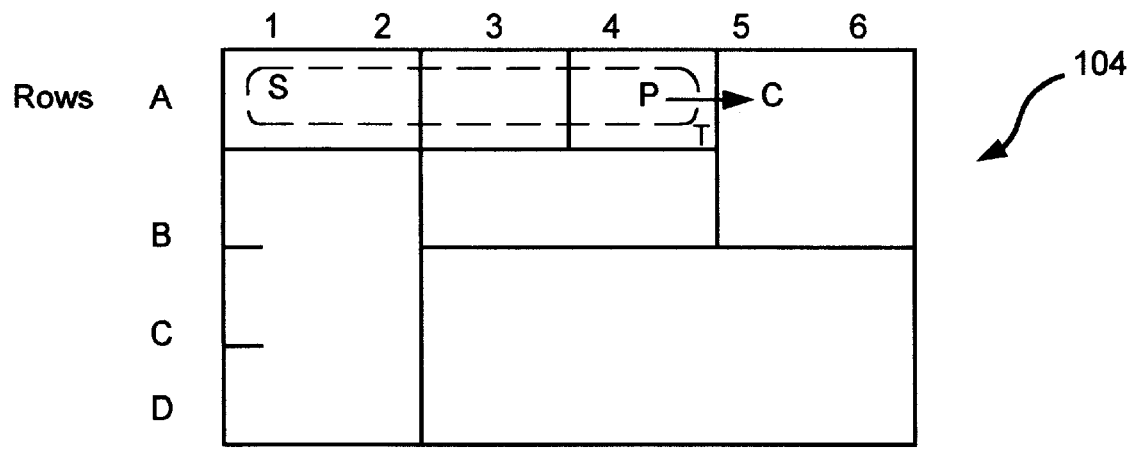
FIGS. 7C and 7D show a table including user selection information and result returned when employing the process of FIG. 7A.
Figure 7D:
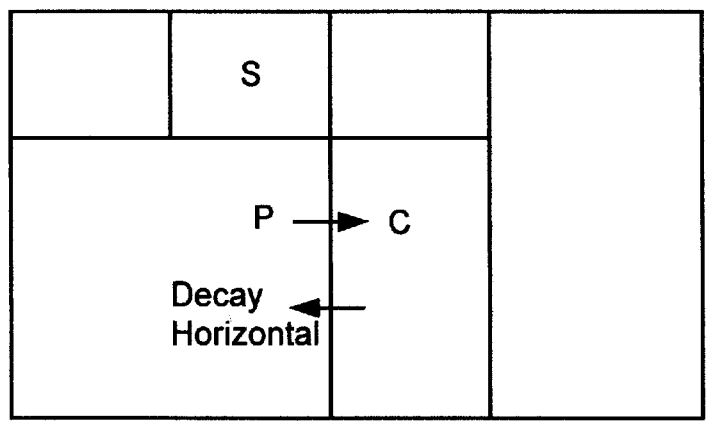

Referring now to FIGS. 7C and 7D, the operation of the horizontal decay process is described with reference to a table 104 that includes starting cells S, previous cells P and current cells C respectively.

In FIG. 7C, the starting cell S is located at the A1 position. A current cell C is located at the A5 position and the path traversed between the starting and end cell is indicated by the arrow and includes previous cell P. The decay function may be used in order to determine a valid selection. Used alone, the decay function examines the selection indicated by the starting and current cells and determines that the selection of cells A1 through A5 is not a valid selection. This is not a valid selection because the A5 cell is part of a larger cell which comprises cells A5, A6, B6 and B7. The A5 cell cannot by itself be separately included in a selection with the A1–A4 cells since it is joined with other cells and all cells of a joined cell must be contained in a valid selection (the enclosure rule). Since no valid selection is detected, the horizontal decaying function begins to traverse or decay in the horizontal direction one cell at a time back towards the starting cell. The decay function checks at each cell as it traverses backward to determine if a valid selection has resulted. In this case, the traversal back to the A4 cell results in a valid selection 170 and so the decay process terminates and a valid selection may be returned.

Referring now to FIG. 7D, a case in which the decay function returns an empty result is shown. Here the starting cell is indicated at cell slot A2. The current cell is cell B2. When the horizontal decay function is applied to this case, an "empty" result is returned because no valid selection is determined. The return of an empty result indicates the use of the maximize function is required.

Maximize Function

The maximize function applies across one of two different orientations, horizontal and vertical. The maximize function guarantees that a selection will be produced based on the initial selection which is both valid and non-empty. In a horizontal maximize function, width as viewed in terms of a page, is of primary concern. The horizontal maximize function guarantees a valid selection by performing a decay in two directions. With a horizontal maximization, a selection attempt is made based on the initial starting and current cells. In the event that the selection is invalid, then a vertical decay function is applied to the selection. In the event that an empty selection is returned in the process of performing the vertical decay, then a single cell horizontal decay is applied based on the current selection. Thereafter, the selection is again checked and a vertical decay function is applied. This process continues until a valid selection is located.

In the maximize function, a horizontal maximization results in a selection having the most width, while in the vertical maximization process, the selection that results is the selection having the greatest height. A pseudocode representation for the function for maximizing an object horizontally is shown in Appendix B.

Figure 8A:
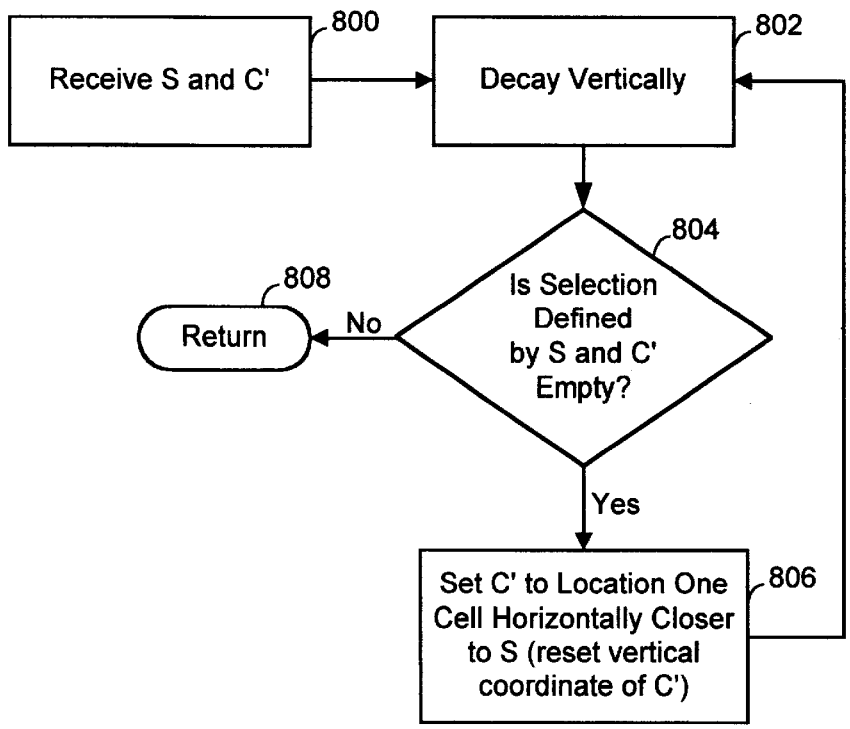
FIGS. 8A and 8B are flow diagrams for a maximize function.

Referring to FIG. 8A, the selection system performs the horizontal maximization process as follows. S and C' are received (step 800). The selection system decays vertically from C' to S until a valid selection or empty selection is identified (step 802). If the selection is empty (step 804) then the selection system decays horizontally toward S one unit (step 806), resets the vertical coordinate of C' (to the vertical coordinate of C) and returns to step 802; otherwise, the selection system returns the updated location for C' (step 808).

Figure 8B:
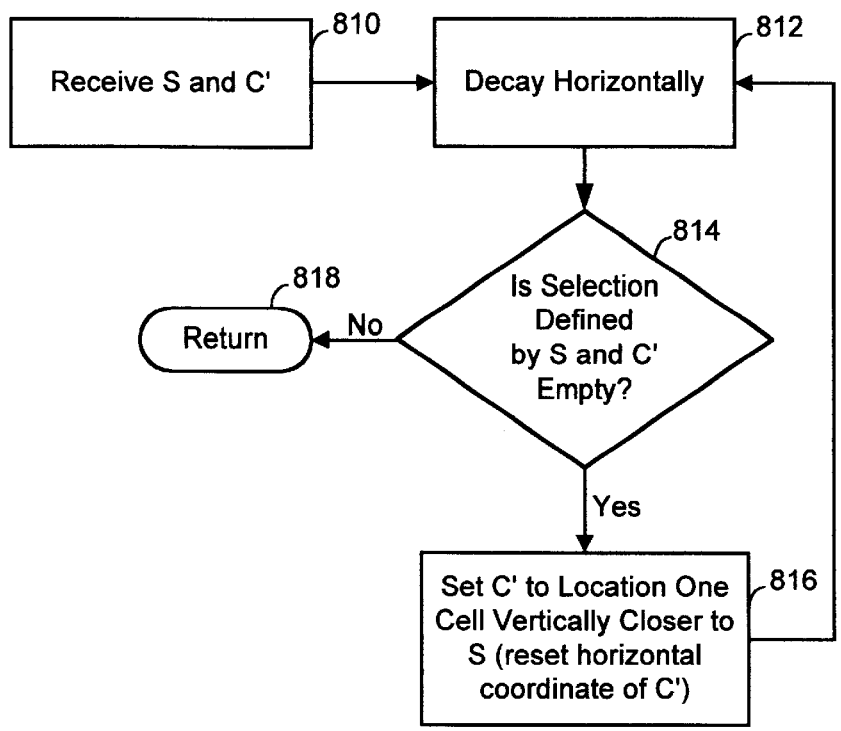

Referring to FIG. 8B, the selection system performs the vertical maximization process as follows. S and C' are received (step 810). The selection system decays horizontally from C' to S until a valid selection or empty selection is identified (step 812). If the selection is empty (step 814) then the selection system decays vertically toward S one unit (step 816), resets the horizontal coordinate of C' (to the horizontal coordinate of C) and returns to step 812; otherwise, the selection system returns the updated location for C' (step 818).

Given the functions described above, an intuitive selection process may be made for all selections of cells within the table. In order to understand the process and the use of the decay and maximization functions, a series of case studies is provided below. In order to determine the selection that is proper based on the rules provided above, the maximize and decay functions are applied to the different cases in order to achieve the most intuitive results. A pseudocode representation for the selection process is shown in Appendix C.

Case 1. Growth in One Axis Only.

Figure 9:
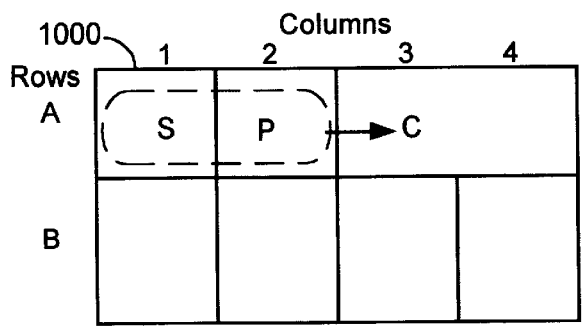
FIGS. 9–11 show a table including user selection information and result returned when employing the processes of FIGS. 7A, 7B, 8A and 8B.

Referring now to FIG. 9, if the starting cell S, current cell C and previous cell P locations indicate that there has been growth only along one axis, then a trim function followed by a decay function is applied. Specifically, in determining the relationship between the previous cell and the current cell, if the growth has been along the horizontal axis, then a horizontal decay function is applied; if growth is along the vertical axis, then a vertical decay function is applied. As can be seen from the figure when the growth is along the horizontal axis, the selection 1000 that would be returned based on a horizontal decay would result in the selection of cells A1 and A2.

Case 2. Decay Along One Axis Only.

Figure 10A:
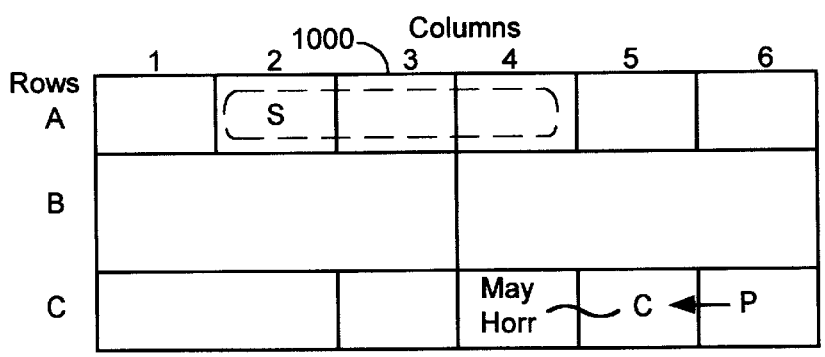
Figure 10B:
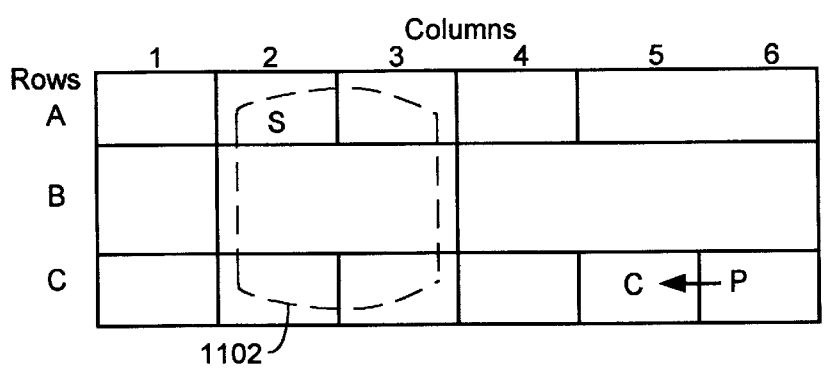

In the event the movement from the last cell to the current cell indicates that there has been decay along one axis only, then a combination of functions is implemented to return a best valid selection. First, the selection tool determines if the selection indicated (the requested selection) is valid. If the selection indicated is valid, then that selection is returned. In the event the selection is not valid, then a trim operation followed by a decay function is invoked in the direction of decay. If the decay function fails to return a valid non-empty selection then a maximization function is applied based on the direction of the decay. For example, if the decay occurs in a horizontal direction, then a horizontal decay function is applied, and if no valid result is returned (non-empty and valid result) then a horizontal maximization function is applied. Conversely, if the decay occurs in the vertical direction, then a vertical decay followed by vertical maximization function is applied. FIG. 10a shows an example of a selection in which the decay is in one axis only and the maximize function is invoked. FIG. 10b shows an example of a selection in which the decay is in one axis only and only the decay function is invoked. The decay in this case is one cell in the horizontal direction. A check determines that the requested selection is not valid. This is because the selection indicated by the starting location of cell A1 and the ending location of cell C5 would be an invalid selection because the selection would violate the enclosure rule. Accordingly, a horizontal decay function is implemented. The result of the horizontal decay function returns an empty result, so a horizontal maximize function is applied. The application of a horizontal maximize function results in a valid selection 1100 which is returned.

Case 3: Growth Along One Axis and Decay Along Another.

Figure 11:
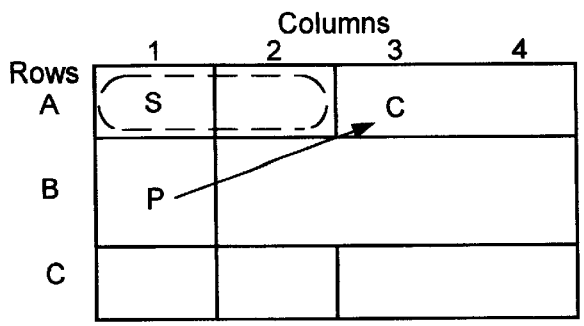

Two possibilities exist under this case. If the growth of the horizontal direction is greater than the decay in the vertical direction, then the maximize horizontally function is applied. If he growth in the vertical direction is greater than the decay in the horizontal direction, then a maximize vertically function is applied. Referring to the FIG. 11, a horizontal growth of two cells is coupled with a vertical decay of one cell in transition from the last cell at B1 to the current cell at A3. Accordingly, the maximize function results applied in a valid selection of cells A1 and A2.

Case 4: Growth Along Both Axes.

If growth occurs along both axes, then a comparison is made as to which growth is greater. For example, if the horizontal growth is greater than the vertical growth, then a maximize horizontally function is applied. If however, the vertical growth is greater than the horizontal growth, then a maximize vertically function is applied.

Case 5: Decay in Both Axes.

In the case where the move from the previous cell to the current cell results in decay along both axes, then a maximization function in the axis that is decayed the least is applied.

The present invention is described in the terms of a selection tool. Once applied, the selection tool can perform a grouping of cells which thereafter can take advantage of other tools to operate on that grouping of cells, for example, to modify text, vary alignments or other characteristics associated with the cell or to join cells.

The invention may be implemented in hardware or firmware or software, or a combination of the three. Preferably, the invention is implemented in a computer program executing on a programmable computer.

The present invention has been described in terms of specific embodiments, which are illustrative of the invention and not to be construed as limiting. Other embodiments are within the scope of the following claims.

What is claimed is:

1. A method of selecting cells in a table, comprising:

selecting a starting cell;

traversing a path from the starting cell to a current cell including identifying a cell at the end of the traversed path as a current cell and identifying a cell immediately preceding the current cell in the traversed path as a previous cell; and determining a selection of cells based on the starting cell, the current cell and the previous cell and positional change resulting from movement along the path from the previous cell to the current cell including identifying a first rule for making a selection of cells, the first rule requiring all cells of a joined cell to be included in a valid selection;

determining if a selection defined by the first and last cell satisfies the first rule;

if so, returning the selection as the selection of cells; and, if not, identifying a new selection different from the selection defined by the first and last cell; and determining if the new selection satisfies the first rule and if so, returning the new selection as the selection of cells.

2. The method of claim 1 wherein the step of determining a selection includes determining horizontal and vertical change resulting from movement along a path from the previous cell to the current cell;

if change results in growth in one axis only, decaying toward the starting cell in the direction of change until a selection is located.

3. The method of claim 2 wherein the step of determining a selection includes determining a last selection from the previous cell and the starting cell; and trimming a requested selection prior to decaying.

4. The method of claim 1 wherein the step of determining a selection includes determining horizontal and vertical change resulting from movement along a path from the previous cell to the current cell;

if change results in decay in one axis only, decaying toward the starting cell in the direction of change until a selection is located, and if none is located, determining a selection by locating a selection having a largest size in a dimension having the change.

5. The method of claim 4 wherein the step of determining a selection includes determining a last selection from the previous cell and starting cell; and trimming a requested selection prior to decaying.

6. The method of claim 5 wherein if the decaying step does not yield a selection then resetting the requested selection prior to determining a selection by locating a selection having a largest size in a dimension having the change.

7. The method of claim 1 wherein the step of determining a selection includes determining horizontal and vertical change resulting from movement along a path from the previous cell to the current cell;

if change indicates growth in one axis and decay in another, determining a selection by locating a selection having a largest size in a dimension having a largest change.

8. The method of claim 1 wherein the step of determining a selection includes determining horizontal and vertical change resulting from movement along a path from the previous cell to the current cell;

if change indicates horizontal and vertical growth, determining a selection by locating a selection having a largest size in a dimension having a largest change.

9. The method of claim 1 wherein the step of determining a selection includes determining horizontal and vertical change resulting from movement along a path from the previous cell to the current cell;

if change indicates horizontal and vertical decay, determining a selection by locating a selection having a largest size in a dimension having a smallest change.

10. A method of selecting cells in a table, the table including individual cells and joined cells, the joined cells including two or more individual cells forming a rectangular region within the table, the cells having one or more user manipulatable properties and each cell containing data, the method comprising:

selecting a starting cell;

identifying a current cell including defining a previous cell along a path between the starting cell and the current cell, determining a selection of cells based on the starting, current and previous cells by determining horizontal and vertical change resulting from movement along a path from the previous cell to the current cell;

if change results in growth in one axis only, decaying toward the starting cell in a direction of change until a selection is located;

if change results in decay in one axis only, decaying toward the starting cell in the direction of change until a selection is located, and if none is located, determining a selection by locating a selection having a largest size in a dimension having the change;

if change indicates growth in one axis and decay in another, determining a selection by locating a selection having a largest size in a dimension having a largest change;

if change indicates horizontal and vertical growth, determining a selection by locating a selection having a largest size in a dimension having a largest change;

if change indicates horizontal and vertical decay, determining a selection by locating a selection having a largest size in a dimension having a smallest change; and where a selection defines a rectangular boundary box region which includes all cells of any joined cell that intersects the boundary box.

11. A method of selecting cells in a table, comprising:

selecting a starting cell;

identifying a current cell including defining a previous cell along a path between the starting cell and the current cell;

determining a selection of cells based on the starting cell, the current cell and the previous cell including, determining horizontal and vertical change resulting from movement along a path from the previous cell to the current cell; and if change results in growth in one axis only, decaying toward the starting cell in the direction of change until a selection is located.

12. The method of claim 11 wherein the step of determining a selection includes determining a last selection from the previous cell and the starting cell; and trimming a requested selection prior to decaying.

13. The method of claim 11 wherein the step of determining a selection includes determining a selection by locating a selection having a largest size in a dimension having the change.

14. The method of claim 13 wherein the step of determining a selection includes determining a last selection from the previous cell and starting cell; and trimming a requested selection prior to decaying.

15. The method of claim 14 wherein if the decaying step does not yield a selection then resetting the requested selection prior to determining a selection by locating a selection having a largest size in a dimension having the change.

16. The method of claim 11 wherein the step of determining a selection includes if change indicates growth in one axis and decay in another, determining a selection by locating a selection having a largest size in a dimension having a largest change.

17. The method of claim 11 wherein the step of determining a selection includes if change indicates horizontal and vertical growth, determining a selection by locating a selection having a largest size in a dimension having a largest change.

18. The method of claim 11 wherein the step of determining a selection includes if change indicates horizontal and vertical decay, determining a selection by locating a selection having a largest size in a dimension having a smallest change.

19. A method of selecting cells in a table, the table including individual cells and joined cells, the joined cells including two or more individual cells forming a rectangular region within the table, the cells having one or more user manipulatable properties and each cell containing data, the method comprising:

selecting a starting cell;

traversing a path from the starting cell to a current cell including identifying a cell at the end of the traversed path as a current cell and identifying a cell immediately preceding the current cell in the traversed path as a previous cell; and determining a selection of cells based on the starting cell, the current cell, the previous cell and positional change resulting from movement along the path from the previous cell to the current cell, where the selection includes all cells of any joined cell that intersects the selection, the determining step including identifying a first rule for making a selection of cells, the first rule requiring all cells of a joined cell to be included in a valid selection;

determining if a selection defined by the first and last cell satisfies the first rule;

determining if the new selection satisfies the first rule and if so, returning the new selection as the selection of cells.

20. The method of claim 19 wherein the step of determining a selection includes determining a selection that defines a rectangular boundary box region which includes all cells of any joined cell that intersects the boundary box.

21. A computer program operable to select cells in a table, the computer program comprising instructions for causing a computer to:

select a starting cell;

traverse a path from the starting cell to a current cell including identify a cell at the end of the traversed path as a current cell and identify a cell immediately preceding the current cell in the traversed path as a previous cell; and determine a selection of cells based on the starting cell, the current cell the previous cell and positional change resulting from movement along the path from the previous cell to the current cell, where the instruction to determine includes instructions to identify a first rule for making a selection of cells, the first rule requiring all cells of a joined cell to be included in a valid selection;

determine if a selection defined by the first and last cell satisfies the first rule;

if so, return the selection as the selection of cells; and, if not, identify a new selection different from the selection defined by the first and last cell; and determine if the new selection satisfies the first rule and if so, return the new selection as the selection of cells.

22. A computer program operable to select cells in a table, the table including individual cells and joined cells, the joined cells including two or more individual cells forming a rectangular region within the table, the cells having one or more user manipulatable properties and each cell containing data, the computer program comprising instructions for causing a computer to:

select a starting cell;

traverse a path from the starting cell to a current cell including identify a cell at the end of the traversed path as a current cell and identify a cell immediately preceding the current cell in the traversed path as a previous cell; and determine a selection of cells based on the starting cell, the current cell, the previous cell and the positional change resulting from movement along the path from the previous cell to the current cell, where the selection includes all cells of any joined cell that intersects the selection, and where the instruction to determine includes instructions to identify a first rule for making a selection of cells, the first rule requiring all cells of a joined cell to be included in a valid selection;

determine if a selection defined by the first and last cell satisfies the first rule;

if so, return the selection as the selection of cells; and, if not, identify a new selection different from the selection defined by the first and last cell; and determine if the new selection satisfies the first rule and if so, return the new selection as the selection of cells.

23. A computer program operable to select cells in a table, the table including individual cells and joined cells, the joined cells including two or more individual cells forming a rectangular region within the table, the cells having one or more user manipulatable properties and each cell containing data, the computer program comprising instructions for causing a computer to:

selecting a starting cell;

identifying a current cell including defining a previous cell along a path between the starting cell and the current cell, determining a selection of cells based on the starting, current and previous cells by determining horizontal and vertical change resulting from movement along a path from the previous cell to the current cell;

if change results in growth in one axis only, decaying toward the starting cell in a direction of change until a selection is located;

if change results in decay in one axis only, decaying toward the starting cell in the direction of change until a selection is located, and if none is located, determining a selection by locating a selection having a largest size in a dimension having the change;

if change indicates growth in one axis and decay in another, determining a selection by locating a selection having a largest size in a dimension having a largest change;

if change indicates horizontal and vertical growth, determining a selection by locating a selection having a largest size in a dimension having a largest change;

if change indicates horizontal and vertical decay, determining a selection by locating a selection having a largest size in a dimension having a smallest change; and where a selection defines a rectangular boundary box region which includes all cells of any joined cell that intersects the boundary box.

* * * * *